United States Patent [19]

Ogawa et al.

[11] Patent Number: 5,287,940
[45] Date of Patent: Feb. 22, 1994

[54] RADIATOR SUPPORT ARRANGEMENT AND APPARATUS FOR A VEHICLE

[75] Inventors: Soichiro Ogawa; Osamu Nozaki; Hideaki Sakata, all of Hiroshima, Japan

[73] Assignee: Mazda Motor Corporation, Hiroshima, Japan

[21] Appl. No.: 83,386

[22] Filed: Jun. 28, 1993

Related U.S. Application Data

[63] Continuation of Ser. No. 758,635, Sep. 12, 1991, abandoned.

[30] Foreign Application Priority Data

Sep. 14, 1990 [JP] Japan ................................ 2-245280
Aug. 1, 1991 [JP] Japan ................................ 3-192894

[51] Int. Cl.⁵ ............................................ B60K 11/04
[52] U.S. Cl. ................................ 180/68.4; 165/67; 248/634
[58] Field of Search ............... 180/68.4, 68.5, 312; 248/632, 634; 165/67, 69

[56] References Cited

U.S. PATENT DOCUMENTS

| | | | |
|---|---|---|---|
| 3,121,467 | 2/1964 | Bryant | 165/69 X |
| 4,538,697 | 9/1985 | Muroi et al. | 180/68.4 |
| 4,662,432 | 5/1987 | Suzuki | 180/68.4 X |
| 4,779,853 | 10/1988 | Sugino et al. | 180/312 X |
| 4,821,828 | 4/1989 | Schwerzler et al. | 180/68.4 |
| 4,887,788 | 12/1989 | Fischer et al. | 248/632 X |
| 4,889,207 | 12/1989 | Von Broock | 180/312 X |
| 4,979,584 | 12/1990 | Charles | 180/68.4 X |

FOREIGN PATENT DOCUMENTS

| | | |
|---|---|---|
| 3521677 | 12/1985 | Fed. Rep. of Germany . |
| 521967 | 7/1921 | France . |
| 57-84223 | 5/1982 | Japan . |
| 60-27723 | 6/1985 | Japan . |
| 62-203820 | 9/1987 | Japan . |

OTHER PUBLICATIONS

The MB Manufacturing Company, Inc. Catalog, 1949.

*Primary Examiner*—Brian L. Johnson
*Attorney, Agent, or Firm*—Price, Heneveld, Cooper, DeWitt & Litton

[57] ABSTRACT

As the most important characteristic feature of the invention, in a radiator support apparatus for a vehicle, a radiator is allowed to effectively serve as a dynamic damper with respect to both a vertical flexural vibration in the back-and-forth direction of a vehicle, and a torsional vibration caused by a vibration in the widthwise direction of the vehicle. The invention relates to a radiator support apparatus for a vehicle, for mounting and supporting the lower end of a radiator on a vehicle body via mount members formed of elastic members at a plurality of support positions including two side positions in the widthwise direction of the vehicle body so as to cause the radiator to serve as a dynamic damper at the front end portion of the vehicle in a low-engine speed state, and is characterized in that the mount members located at the two side positions, in the widthwise direction of the vehicle body, of the lower end of the radiator have different spring constants.

17 Claims, 10 Drawing Sheets

RADIATOR SUPPORT ARRANGEMENT AND APPARATUS FOR A VEHICLE

This is a continuation of co-pending application Ser. No. 07/758,635, filed on Sep. 12, 1991, now abandoned.

BACKGROUND OF THE INVENTION

The present invention relates to a radiator support apparatus for a vehicle, which causes a radiator to serve as a dynamic damper so as to eliminate a vehicle body vibration in a low-engine speed state.

Conventionally, as disclosed in, e.g., Japanese Patent Laid-Open No. 57-84223, in order to eliminate a so-called idling vibration or a vehicle body low-frequency vibration such as low-frequency noise caused by a variation in rotation in an engine idling state, a dynamic damper is constituted by utilizing the mass of a radiator mounted in the front end portion of a vehicle body, thereby eliminating a vertical flexural vibration in the back-and-forth direction of the vehicle body. A dynamic damper of this type is normally constituted in such a manner that the lower end portion of a radiator is attached to a vehicle body using two, i.e., right and left mount members comprising elastic members, and the upper end portion of the radiator is also attached to the vehicle body using two mount members. In this case, the upper and lower mount members are set to have a spring constant, so that the dynamic damper can provide its effect in a low-engine speed state.

The flexural vibration in the back-and-forth direction of the vehicle body normally has a vertical vibration mode which exhibits a maximum amplitude at the front end of the vehicle body. Therefore, when the dynamic damper is constituted as described above, the radiator defining the damper mass is vertically vibrated at the maximum amplitude position of the flexural vibration. For this reason, when damper characteristics are properly selected, the flexural vibration of the vehicle body in the low-engine speed state can be canceled by bouncing.

In this manner, when the vehicle body low-frequency vibration is eliminated by the dynamic damper utilizing the mass of the radiator, the vertical flexural vibration in the back-and-forth direction of the vehicle body is conventionally assumed as the vehicle body low-frequency vibration to be eliminated. However, in a front wheel drive vehicle, in which heavy members are concentrated on the front end portion of the vehicle body, it has recently been found that a so-called torsional vibration caused by a vertical vibration of the front end portion of the vehicle body in the widthwise direction of the vehicle body occurs in addition to the flexural vibration in the back-and-forth direction of the vehicle body.

FIG. 1 shows vehicle body low-frequency vibration characteristics in a front wheel drive vehicle. In this case, as can be seen from FIG. 1, vibration peaks are present at a frequency of about 22 Hz (corresponding to an engine speed of 660 rpm) of the vehicle body vibration, and at about 27 Hz (corresponding to an engine speed of 750 rpm). The peak at 22 Hz corresponds to that of the torsional vibration, and the peak at 27 Hz corresponds to that of the flexural vibration. However, in the conventional dynamic damper, the right and left mount members at the lower end portion of the radiator have the same spring constant. For this reason, the dynamic damper characteristics are as represented by a solid curve in FIG. 8. More specifically, a pitching resonance ① is close to a bouncing resonance ②. Therefore, when the bouncing resonance is set at about 27 Hz so as to eliminate the flexural vibration, the pitching resonance appears at about 25 Hz, and the torsional vibration at about 22 Hz cannot be eliminated.

SUMMARY OF THE INVENTION

The present invention has been made in consideration of the above situation, and has as its object to provide a radiator support apparatus for a vehicle, which can cause a radiator to effectively serve as a dynamic damper for both a vertical flexural vibration in the back-and-forth direction of a vehicle body and a torsional vibration caused by a vibration in the widthwise direction of the vehicle body.

The present invention pays attention to the fact that in a front wheel drive vehicle a torsional vibration caused by a vertical vibration of the front end portion of a vehicle body in the widthwise direction poses a low-frequency vibration problem as well as a flexural vibration in the back-and-forth direction of the vehicle body, which vibration has been recognized as a conventional problem. Thus, according to the present invention, in a dynamic damper using a radiator as a damper mass, at least lower-end, right and left mount members are set to have different spring constants to shift the tuning point of the pitching resonance, thereby eliminating both the flexural vibration and the torsional vibration.

More specifically, in an arrangement of a radiator support apparatus for a vehicle, according to the present invention, for mounting and supporting a lower end of a radiator on a vehicle body via mount members formed of elastic members at a plurality of support positions including two side positions in a widthwise direction of the vehicle body so as to cause the radiator to serve as a dynamic damper at a front end portion of the vehicle in a low-engine speed state, the mount members located on the two side positions, in the widthwise direction of the vehicle body, of the lower end of the radiator have different spring constants.

In the radiator support apparatus for a vehicle according to the present invention, of the mount members located on the two side positions, in the widthwise direction of the vehicle body, of the lower end of the radiator, a spring constant of the mount member nearer the position of the center of gravity of the radiator is set to be smaller than a spring constant of the other mount member.

In the radiator support apparatus for a vehicle according to the present invention, the difference between the spring constants of the mount members located on the two side positions, in the widthwise direction of the vehicle body, of the lower end of the radiator is set to be larger as the position of the center of gravity of the radiator is separated farther from the central line of the vehicle body in the widthwise direction thereof.

In the radiator support apparatus for a vehicle according to the present invention, the radiator is mounted on the vehicle body, so that the central line of the radiator is located at a position offset in one direction from the central line of the vehicle body in the widthwise direction thereof.

In the radiator support apparatus for a vehicle according to the present invention, a motorized fan is mounted on the radiator at a position offset in the one direction from the central line of the radiator, and the position of the center of gravity of the radiator as a whole including the motorized fan is set at a position offset in the one direction from the central line of the vehicle body in the widthwise direction thereof.

In the radiator support apparatus for a vehicle according to the present invention, of the mount members located on the two side positions, in the widthwise direction of the vehicle body, of the lower end of the radiator, a spring constant of the mount member offset in the one direction is set to be smaller than a spring constant of the other mount member.

In the radiator support apparatus for a vehicle according to the present invention, two motorized fans are mounted on the radiator at positions offset to two sides from the central line of the radiator along the widthwise direction of the vehicle body, and the position of the center of gravity of the radiator as a whole including the two motorized fans is set at a position offset in the one direction from the central line of the vehicle body in the widthwise direction thereof.

In the radiator support apparatus for a vehicle according to the present invention, the spring constants of the mount members are set to have different values between a case wherein the radiator is mounted in a vehicle comprising a manual transmission, and a case wherein the radiator is mounted in a vehicle comprising an automatic transmission.

In the radiator support apparatus for a vehicle according to the present invention, a spring constant value of the mount member nearer the position of the center of gravity of the radiator, which value is set when the radiator is mounted in the vehicle comprising the manual transmission, is set to be smaller than the spring constant which is set when the radiator is mounted in the vehicle comprising the automatic transmission.

In the radiator support apparatus for a vehicle according to the present invention, a spring constant value of the mount member farther from the position of the center of gravity of the radiator, which value is set when the radiator is mounted in the vehicle comprising the manual transmission, is set to be smaller than the spring constant which is set when the radiator is mounted in the vehicle comprising the automatic transmission.

In the radiator support apparatus for a vehicle according to the present invention with the above-mentioned arrangement, the radiator is mounted on the vehicle body via mount members formed of elastic members at a plurality of support positions including at least two side positions, in the widthwise direction of the vehicle body, of the lower end of the radiator, thereby constituting a dynamic damper using the radiator as a damper mass. In this case, the mount members have different spring constants. For example, of the mount members located at the two sides. The spring constant of the mount member closer to the center of gravity of the radiator is set to be smaller than that of the other mount member. Thus, a pitching resonance point of the dynamic damper can be set to be sufficiently separated from a bouncing resonance point. Therefore, both a vertical flexural vibration in the back-and-forth direction of the vehicle body caused by bouncing, and a torsional vibration in the widthwise direction of the vehicle body caused by pitching can be eliminated at the same time. In particular, since the spring constant of the mount member closer to the center of gravity of the radiator is set to be smaller than that of the other mount member, the radiator can be set as a dynamic damper so as to eliminate both the vertical flexural vibration in the back-and-forth direction of the vehicle body, and the torsional vibration.

Other features and advantages of the present invention will be apparent from the following description taken in conjunction with the accompanying drawings, in which like reference characters designate the same or similar parts throughout the FIGURES thereof.

DETAILED DESCRIPTION OF THE PREFERRED EMBODIMENTS

An arrangement of a radiator support apparatus for a vehicle according to an embodiment of the present invention will be described in detail below with reference to FIGS. 2 to 8.

Figure 1:
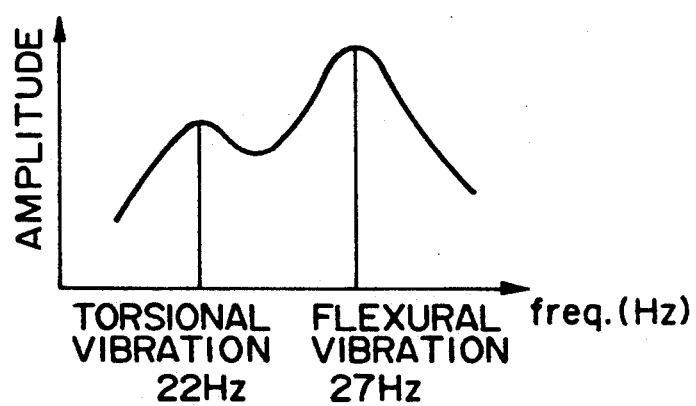
FIG. 1 is a graph showing vehicle body low-frequency vibration characteristics in a conventional FF vehicle.
Figure 2:
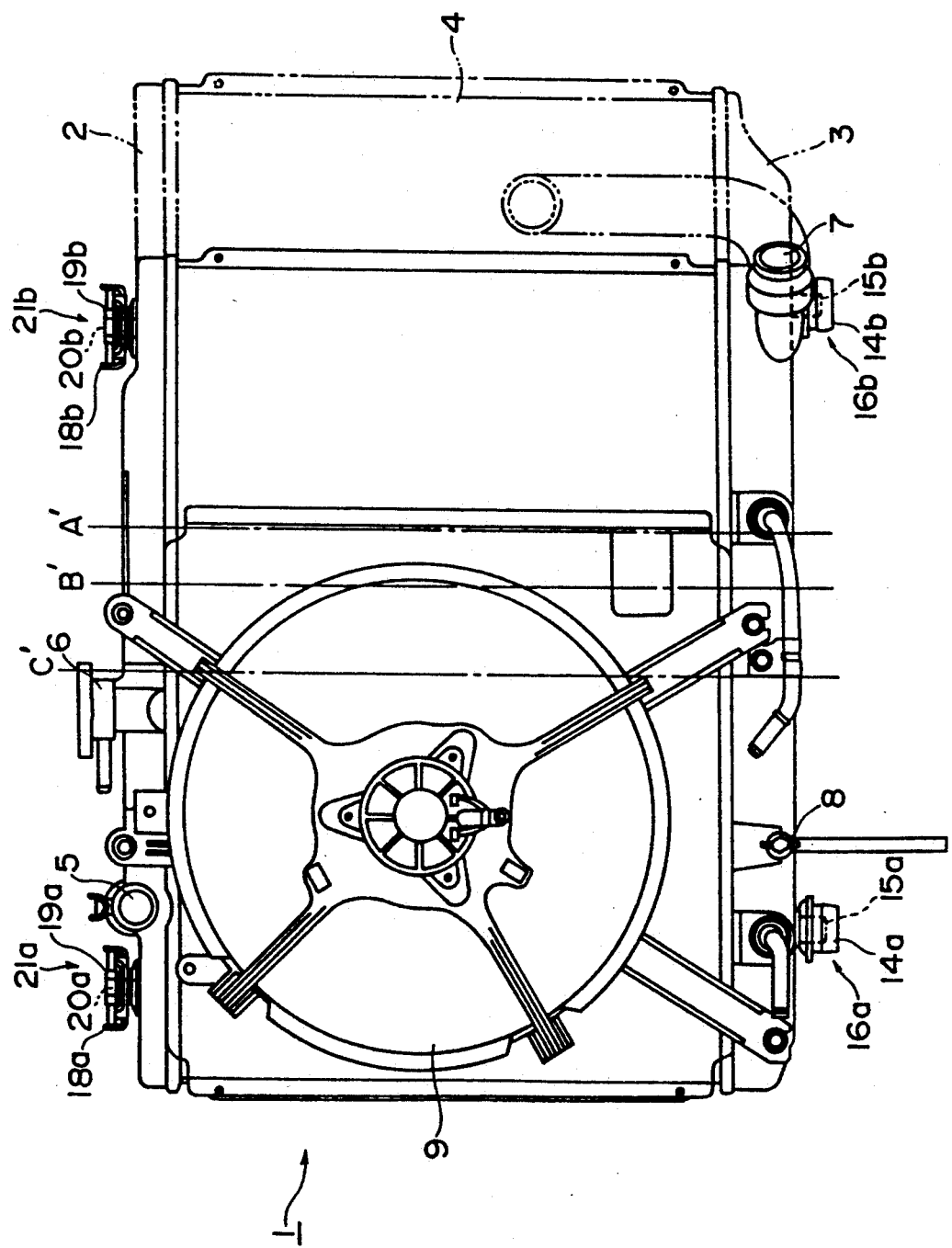
FIG. 2 is a rear view showing an arrangement of a radiator support apparatus for a vehicle according to an embodiment of the present invention.
Figure 3:
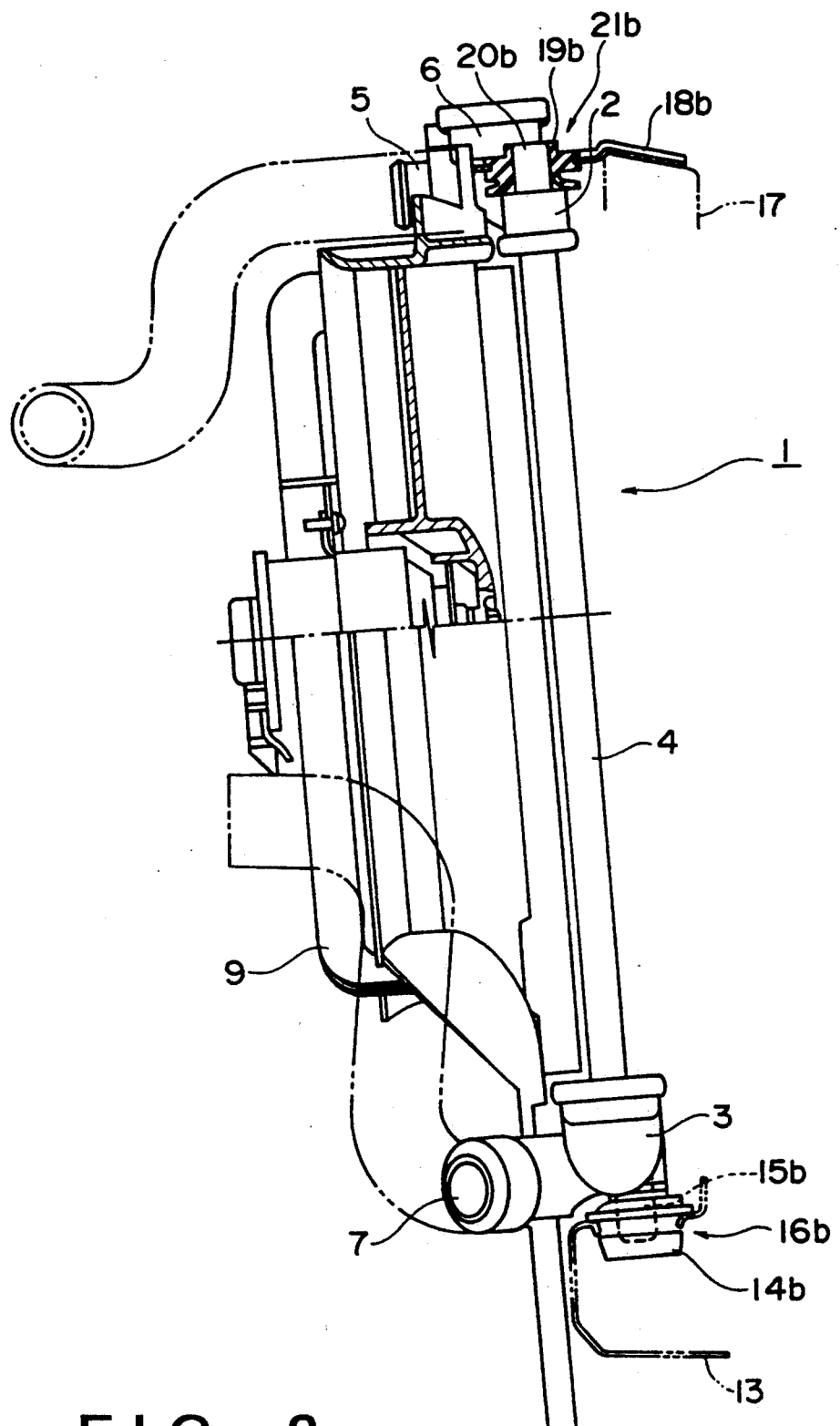
FIG. 3 is a partially cutaway side sectional view of a radiator shown in FIG. 2.
Figure 4:
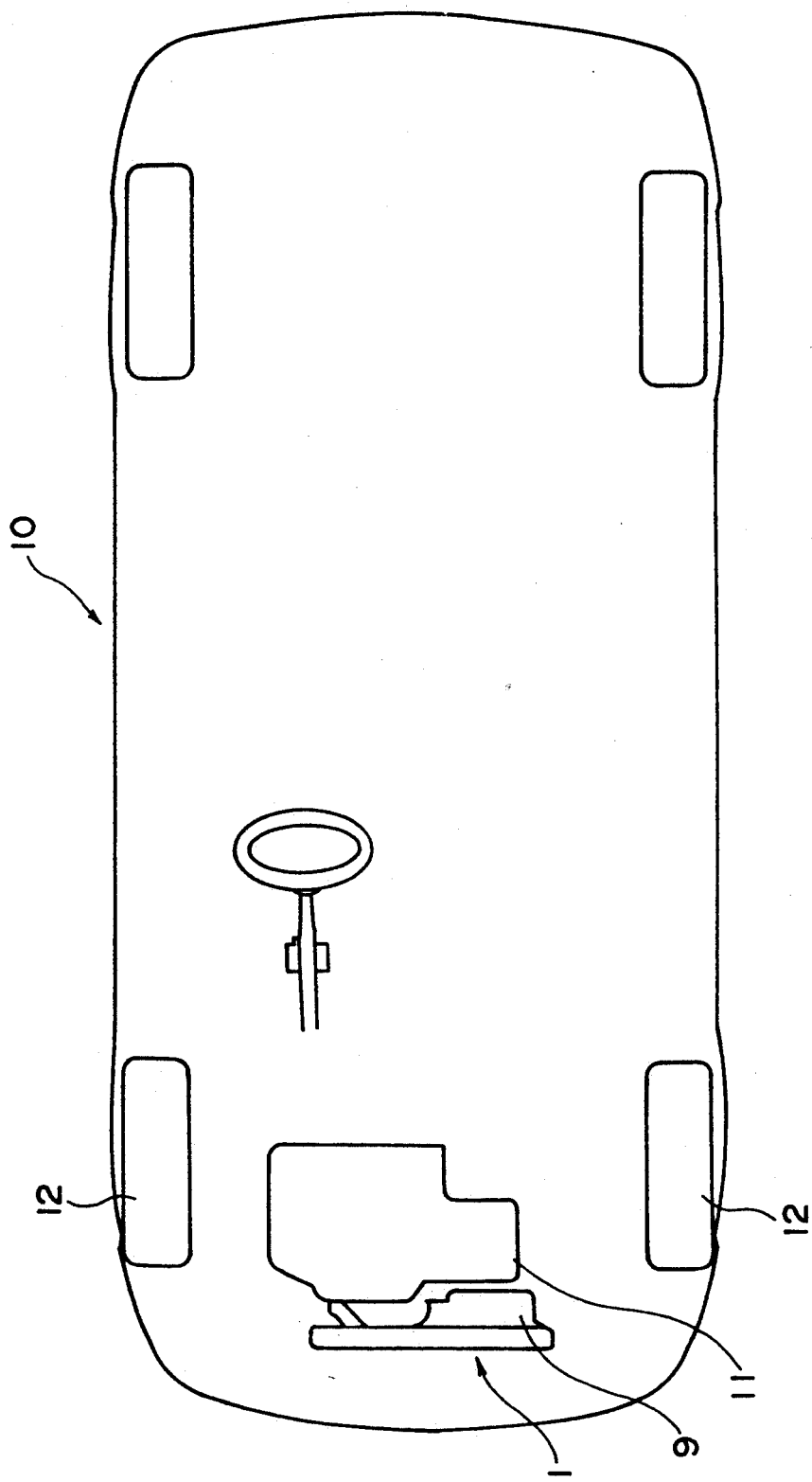
FIG. 4 is a schematic plan view showing an arrangement of an engine, a radiator, and the like in a vehicle of this embodiment.
Figure 5:
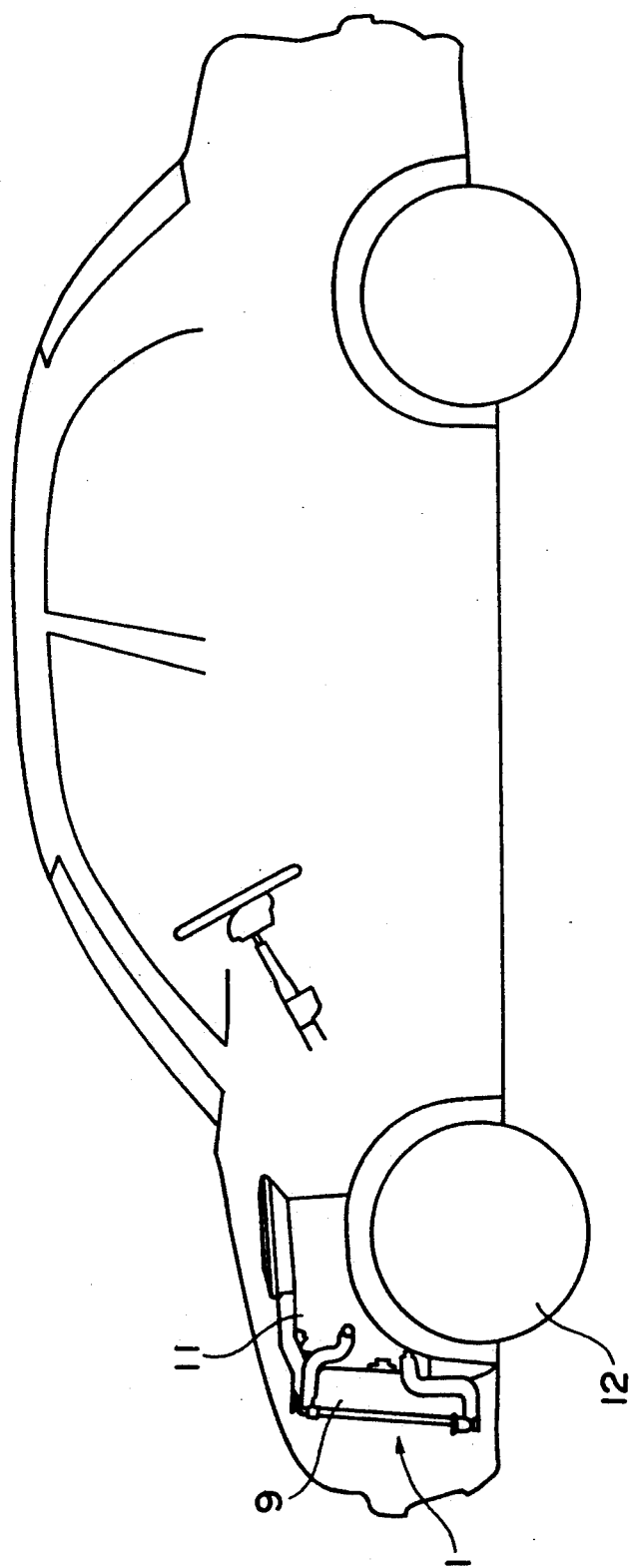
FIG. 5 is a side view of the arrangement of FIG. 4.

FIG. 2 is a rear view of a radiator according to the embodiment of the present invention, FIG. 3 is a partially cutaway side sectional view of the radiator, FIG. 4 is a schematic plan view of an arrangement of an engine, a radiator, and the like in a vehicle of this embodiment, and FIG. 5 is a schematic sectional view showing the arrangement of the engine, the radiator, and the like.

As shown in FIGS. 2 to 5, a radiator 1 of this embodiment is mainly constituted by an upper tank 2, a lower tank 3, and a core 4 for flowing water in the upper tank 2 toward the lower tank 3. The upper tank 2 comprises a cooling water inlet port 5 and a water filler port 6 for introducing cooling water from a water jacket (not shown) of an engine. The lower tank 3 comprises a cooling water outlet port 7, and a drain cock 8. A motorized fan 9 for forcibly causing air to communicate through the core 4 is attached to the rear surface side of the radiator 1 to cover the left half portion of the core 4.

The radiator 1 is arranged in front of an engine 11 in the front end portion of a vehicle 10.

The radiator 1 is mounted on the vehicle body at two positions of each of its upper and lower ends. Right and left lower mounts 16b and 16a respectively consisting of lower mount rubbers 14b and 14a fitted in a front cross member 13 of the vehicle body, and projections 15b and 15a of the radiator 1, which are fitted in the lower mount rubbers, are arranged on the lower end of the radiator 1. Right and left upper mounts 21b and 21a respectively consisting of brackets 18b and 18a fixed to a radiator support 17, upper mount rubbers 19b and 19a respectively fitted in these brackets 18b and 18a, and projections 20b and 20a of the radiator, which are respectively fitted in these upper mount rubbers 19b and 19a are arranged on the upper end of the radiator 1.

The lower mount rubbers 14a and 14b respectively constituting the two lower mounts 16a and 16b are set, so that the left rubber (14a) when viewed from the rear surface side of the radiator 1 has a smaller spring constant than that of the right rubber (14b). More specifically, in, e.g., a vehicle (MT vehicle) comprising a manual transmission, the spring constant of the left lower mount rubber 14a is set to be 6.9 kg/mm, and the spring constant of the right lower mount rubber 14b is set to be 14.4 kg/mm. On the other hand, in a vehicle (AT vehicle) comprising an automatic transmission, the spring constant of the left lower mount rubber 14a is set to be 8.3 kg/mm, and the spring constant the right lower mount rubber 14b is set to be 16.3 kg/mm.

Of course, these setting values are changed depending on the specifications of vehicles and the weights of radiators. Note that the radiators 1 of the MT and AT vehicles have different dimensions in the widthwise direction of the vehicle body. The radiator of the AT vehicle has a larger dimension than that of the MT vehicle in the widthwise direction of the vehicle body, as indicated by an imaginary line (alternate long and two short dashed line) in FIG. 2. The radiator 1 of the AT vehicle is arranged, so that its central line B is offset to the left from the central line A' of the vehicle body in its widthwise direction. On the other hand, the radiator 1 of the MT vehicle is arranged, so that its central line C' is further offset to the left from the central line B' of the radiator 1 of the AT vehicle.

The motorized fan 9 is mounted on the left-side portion of the radiator 1. For this reason, the center of gravity of the radiator 1 as a whole is set at a position offset to the left from the central line A' of the vehicle body in its widthwise direction (i.e., at a position between the radiator central lines B' and C' and the central position of the motorized fan 9 in both the AT and MT vehicles). Therefore, the left lower mount 16a is located nearer the center of gravity of the radiator 1 than the right lower mount 16b.

Figure 6C:
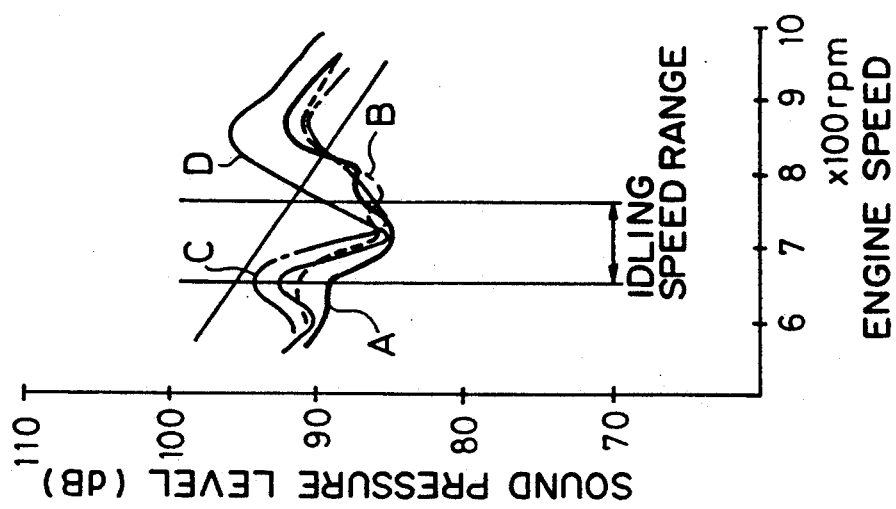
FIGS. 6(a) to 6(c) are graphs showing experimental data of idling vibration and low-frequency noise characteristics in an MT vehicle according to this embodiment.
Figure 6B:
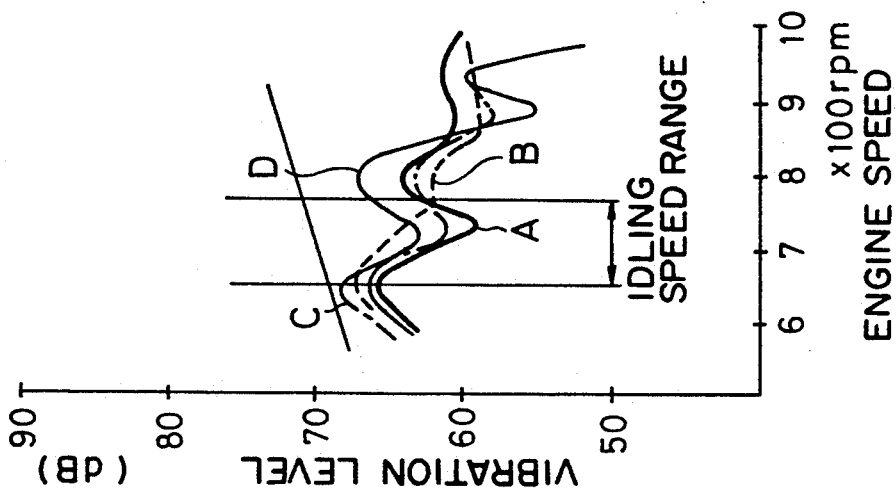
Figure 6A:
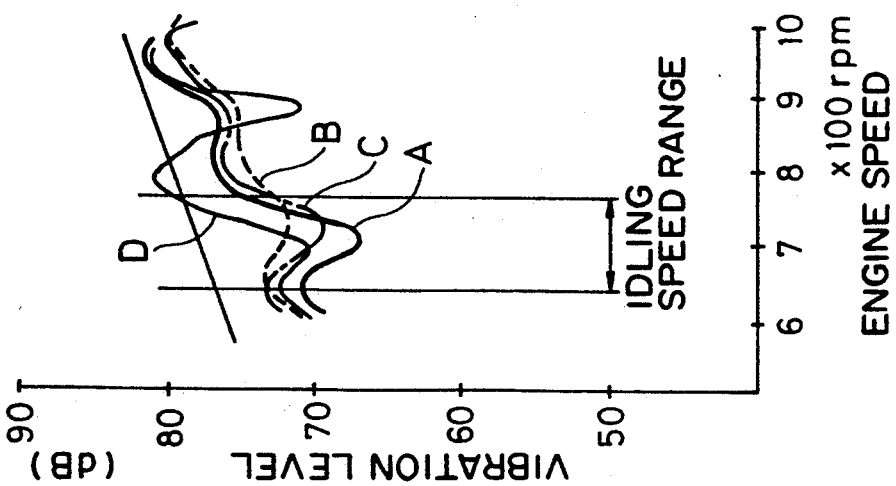

FIGS. 6(a) to 6(c) show experimental data of idling vibration and low-frequency noise characteristics in an MT vehicle. FIG. 6(a) shows a steering wheel vibration level, FIG. 6(b) shows a floor vibration level, and FIG. 6(c) shows a low-frequency noise level. Note that the weight of the radiator is about 5.8 kg when the motorized fan is attached to the radiator, and cooling water is filled. In FIGS. 6(a) to 6(c), solid curves A represent changes in level obtained when the spring constant of the left lower mount rubber 14a is set to be 6.9 kg/mm, and the spring constant of the right lower mount rubber 14b is set to be 14.4 kg/mm. Dotted curves B represent changes in level obtained when the spring constants of both the right and left lower mount rubbers 14b and 14a are set to be 9.3 kg/mm. Alternate long and short dashed curves C represent changes in level obtained when the spring constants of both the right and left lower mount rubbers 14b and 14a are set to be 6.9 kg/mm. Thin solid curves D represent changes in level obtained when the radiator 1 is rigidly mounted on the vehicle body without using the mount rubbers. These curves B to D show comparative examples.

Figure 7A:
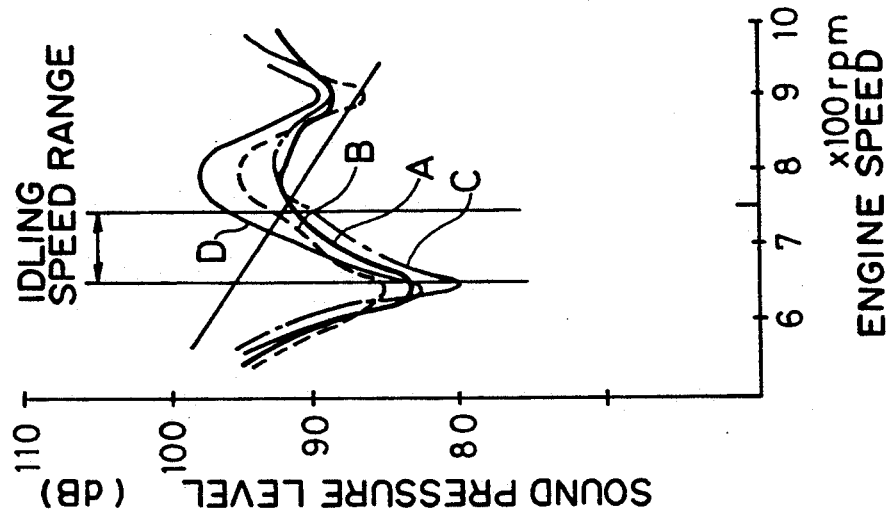
FIGS. 7(a) to 7(c) are graphs showing experimental data of idling vibration and low-frequency noise characteristics in an AT vehicle according to this embodiment.
Figure 7B:
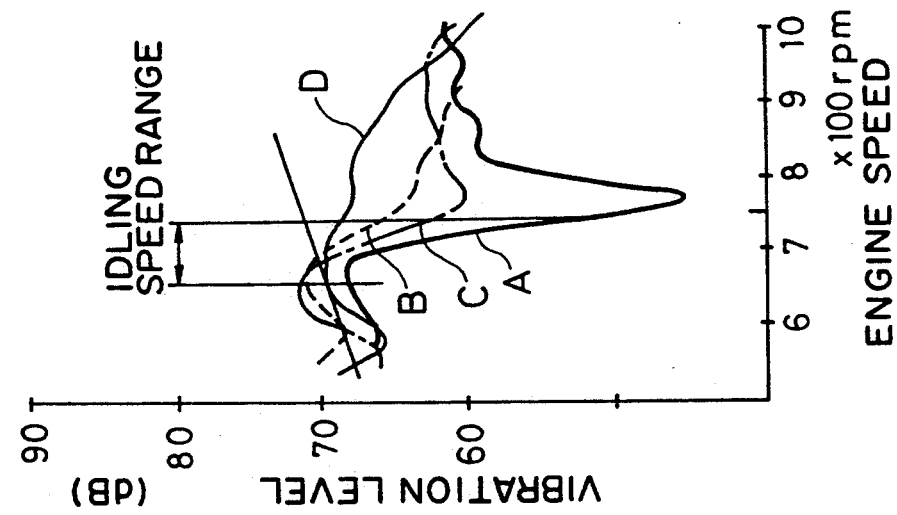
Figure 7C:
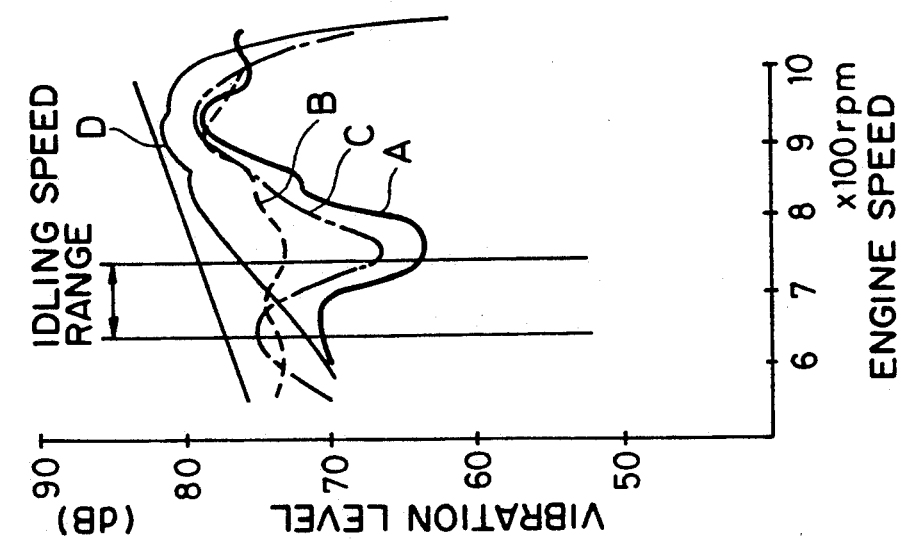

FIGS. 7(a) to 7(c) show experimental data of idling vibration and low-frequency noise characteristics in an AT vehicle. FIG. 7(a) shows a steering wheel vibration level, FIG. 7(b) shows a floor vibration level, and FIG. 7(c) shows a low-frequency noise level. Note that the weight of the radiator is about 7.3 kg when the motorized fan is attached to the radiator, and cooling water is filled. In FIGS. 7(a) to 7(c), solid curves A represent changes in level obtained when the spring constant of the left lower mount rubber 14a is set to be 8.3 kg/mm, and the spring constant of the right lower mount rubber 14b is set to be 16.3 kg/mm. Dotted curves B represent changes in level obtained when the spring constants of both the right and left lower mount rubbers 14b and 14a are set to be 6.9 kg/mm. Alternate long and short dashed curves C represent changes in level obtained when the spring constants of both the right and left lower mount rubbers 14b and 14a are set to be 9.3 kg/mm. Thin solid curves D represent changes in level obtained when the radiator 1 is rigidly mounted on the vehicle body without using the mount rubbers. These curves B to D show comparative examples.

As can be seen from these data, it can be confirmed that the vibration levels and sound pressure levels in an idling engine speed range (i.e., an engine speed range of 660 rpm to 750 rpm) can be reduced, when the right and left lower mount rubbers 14b and 14a are set to have different spring constants, and the spring constant of the left lower mount rubber 14a located near the center of gravity of the radiator is set to be smaller than that of the right lower mount rubber 14b.

Figure 8:
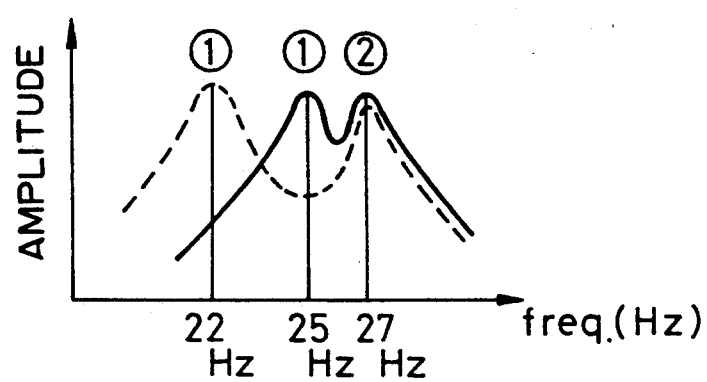
FIG. 8 is an explanatory view for comparing dynamic damper characteristics of this embodiment with those of the prior art.

The dynamic damper characteristics in this case are as indicated by a dotted curve in FIG. 8. More specifically, when the right and left lower mount rubbers 14b and 14a are set to have different spring constants, a pitching resonance ①' is separated from a bouncing resonance ②. As a result, the bouncing resonance can be matched with a flexural vibration peak appearing at about 27 Hz, while the pitching resonance can be matched with a torsional vibration peak appearing at about 22 Hz.

The present invention is not limited to the arrangement of the above embodiment, and various changes and modifications may be made within the spirit and scope of the invention.

For example, in the above embodiment, the spring constant of the lower mount rubber located nearer the center of gravity of the radiator 1 is set to be smaller than that of the other lower mount rubber. However, the present invention is not limited to this arrangement. For example, when the spring constant of the lower mount rubber farther from the center of gravity of the radiator may be set to be smaller than that of the other lower mount rubber, an equivalent effect can be expected. This setting is particularly affective in a vehicle in which a torsional vibration peak appears at a frequency higher than that of a flexural vibration peak.

The present invention is effective for a vehicle which has a center of gravity on the front side, and causes a torsional vibration, and can also be applied to vehicles other than a front wheel drive vehicle.

Figure 9:
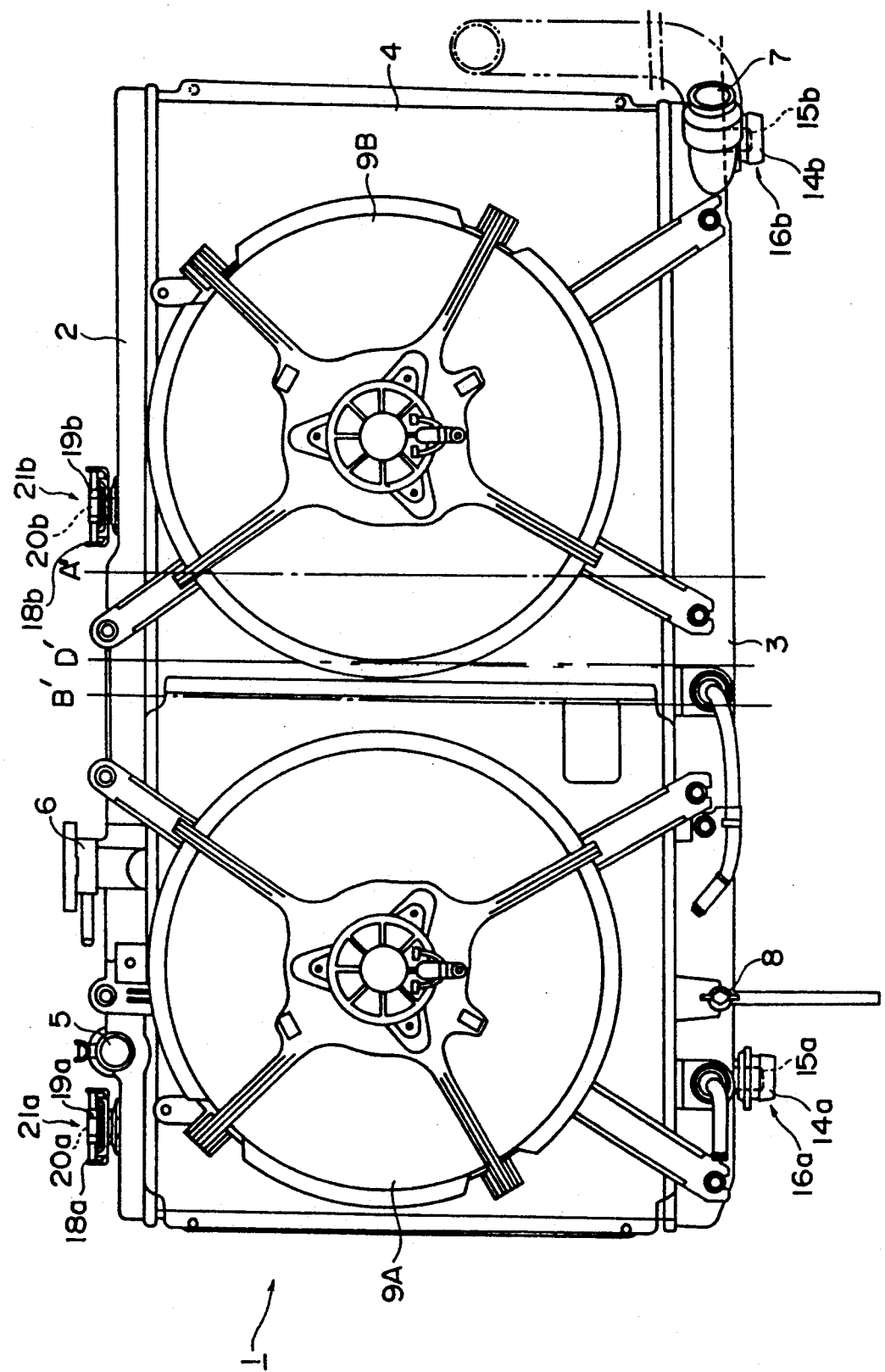
FIG. 9 is a rear view showing an arrangement of a radiator support apparatus for a vehicle according to another embodiment of the present invention.
Figure 10C:
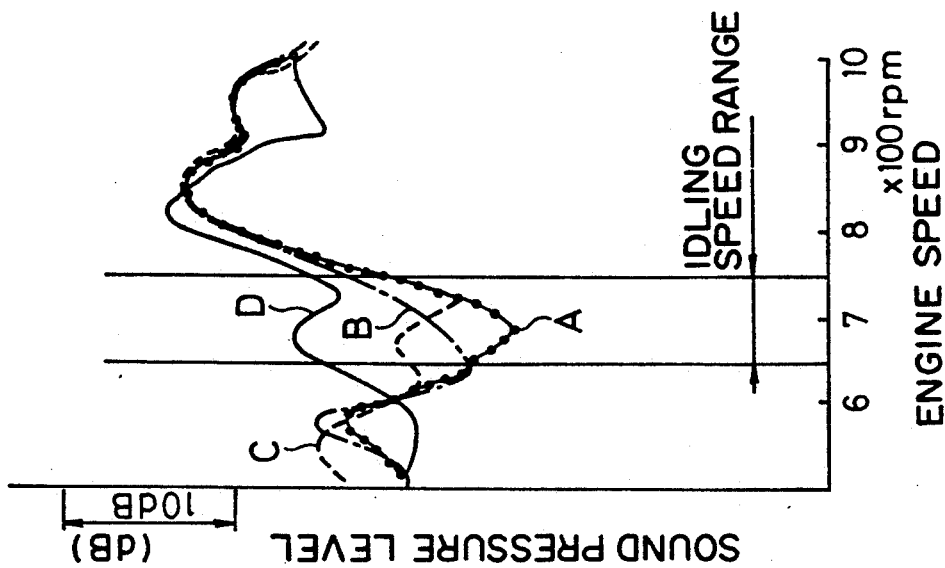
FIGS. 10(a) to 10(c) are graphs showing experimental data of idling vibration and low-frequency noise characteristics in an AT vehicle in the embodiment shown in FIG. 9.

In the above embodiment, the motorized fan mounted on the left-side portion of the radiator 1. However, the present invention is not limited to this arrangement. As shown in FIGS. 9 to 10(c) of another embodiment, motorized fans 9B and 9A may be arranged on the right- and left-side portions of the radiator 1.

An arrangement of a radiator support apparatus for a vehicle according to another embodiment of the present invention will be described below with reference to FIGS. 9 to 10(c). Note that the same reference numerals in this embodiment denote the same parts as in the above embodiment, and a detailed description thereof will be omitted.

As has been described above, this embodiment is substantially the same as the above-mentioned embodiment, except that a pair of right and left motorized fans 9B and 9A are arranged, as shown in FIG. 9. As a result, in this embodiment, the position of the center of gravity substantially coincides with the central line D' of the radiator 1 as compared to the above-mentioned embodiment. However, as has been described in the above embodiment, the central line D' of the radiator 1 is set at a position offset to the left from the central line A of the vehicle body in its widthwise direction. For this reason, the problems pointed out in the prior art remain unsolved in this embodiment.

Figure 10B:
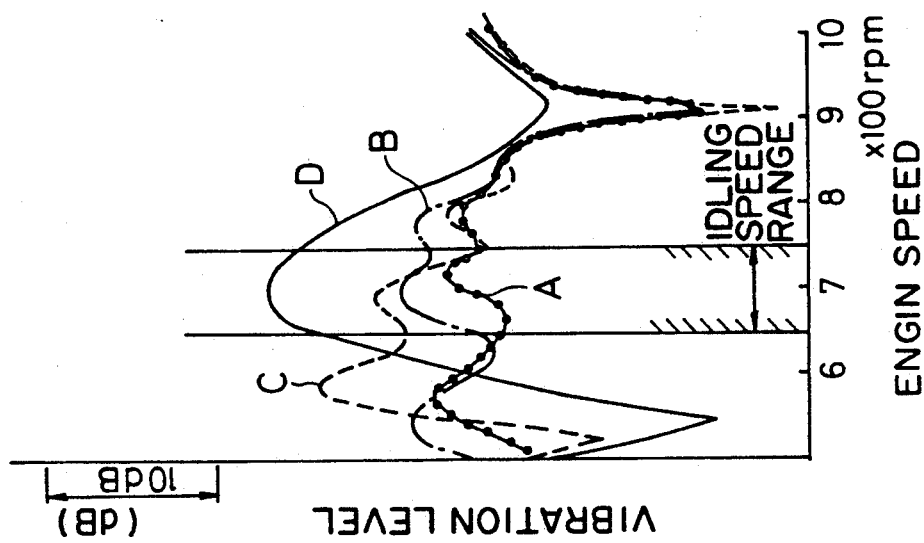
Figure 10A:
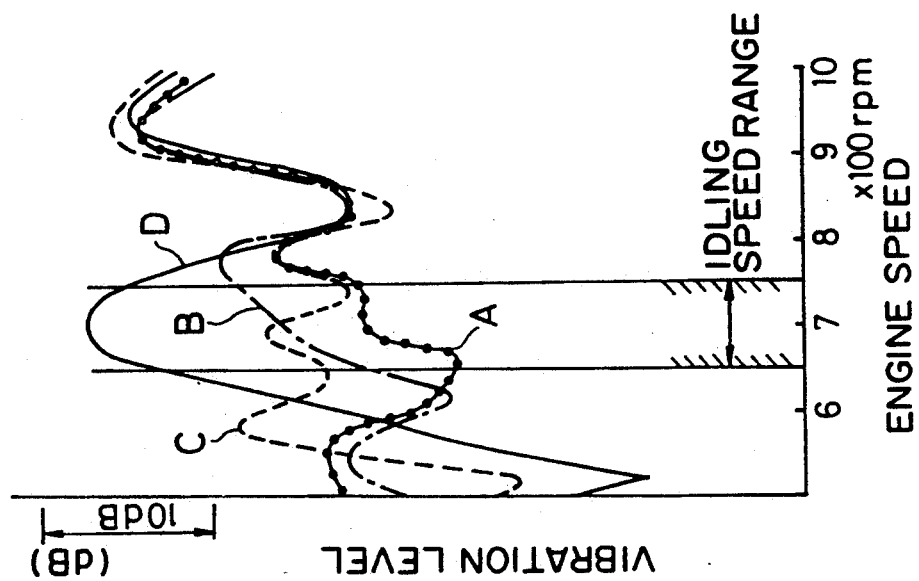

In this embodiment, an AT vehicle will be exemplified below. FIGS. 10(a) to 10(c) show experimental data of idling vibration and low-frequency noise characteristics in an AT vehicle. FIG. 10(a) shows a steering wheel vibration level, FIG. 10(b) shows a floor vibration level, and FIG. 10(c) shows a low-frequency noise level. Note that the weight of the radiator is about 12 kg when the motorized fans are attached to the radiator, and cooling water is filled. In FIGS. 10(a) to 10(c), solid curves A represent changes in level obtained when the spring constant of the left lower mount rubber 14a is set to be 8.9 kg/mm, and the spring constant of the right lower mount rubber 14b is set to be 10.0 kg/mm. Dotted curves B represent changes in level obtained when the spring constants of both the right and left lower mount rubbers 14b and 14a are set to be 10.0 kg/mm. Alternate long and short dashed curves C represent changes in level obtained when the spring constants of both the right and left lower mount rubbers 14b and 14a are set to be 8.9 kg/mm. Thin solid curves D represent changes in level obtained when the radiator 1 is rigidly mounted on the vehicle body without using the mount rubbers. These curves B to D show comparative examples.

As can be seen from these data, it can be confirmed that the vibration levels and sound pressure levels in an idling engine speed range (i.e., an engine speed range of 660 rpm to 750 rpm) can be reduced, when the right and left lower mount rubbers 14b and 14a are set to have different spring constants, and the spring constant of the left lower mount rubber 14a located near the center of gravity of the radiator is set to be smaller than that of the right lower mount rubber even when a pair of right and left motorized fans 9B and 9A are attached to the radiator 1.

As many apparently widely different embodiments of the present invention can be made without departing from the spirit and scope thereof, it is to be understood that the invention is not limited to the specific embodiments thereof except as defined in the appended claims.

What is claimed is:

1. In a radiator support apparatus for a vehicle, for mounting and supporting a lower end of a radiator or a vehicle body via mount members formed of elastic members at two side positions of said lower end of said radiator in a widthwise direction of the vehicle body so as to cause a supported radiator to serve as a dynamic damper at a front end portion of the vehicle in a low-engine speed state, the improvement in which said mount members located on the two side positions have different spring constants so that the resonance frequencies of pitching and bouncing movements of said radiator support apparatus may substantially coincide with peak frequencies of torsional and flexural vibrations of the vehicle body, respectively, the mount member having the smaller spring constant being positioned nearer the center of gravity of said radiator than the other mount member.

2. The apparatus according to claim 1, wherein
   a difference between the spring constants of said mount members located on the two side positions, in the widthwise direction of the vehicle body, of the lower end of said radiator is set to be larger as the position of the center of gravity of said radiator is separated farther from a central line of the vehicle body in the widthwise direction thereof.

3. The apparatus according to claim 1, wherein
   said radiator is mounted on the vehicle body, so that a central line of said radiator is located at a position offset in one direction from a central line of the vehicle body in the widthwise direction thereof.

4. The apparatus according to claim 3, wherein
   a motorized fan is mounted on said radiator at a position offset in the one direction from the central line of said radiator, and a position of a center of gravity of said radiator as a whole including said motorized fan is set at a position offset in the one direction from the central line of the vehicle body in the widthwise direction thereof.

5. The apparatus according to claim 4, wherein
   of said mount members located on the two side positions, in the widthwise direction of the vehicle body, of the lower end of said radiator, a spring constant of the mount member offset in the one direction is set to be smaller than a spring constant of the other mount member.

6. The apparatus according to claim 5, wherein
   a difference between the spring constants of said mount members located on the two side positions, in the widthwise direction of the vehicle body, of the lower end of said radiator is set to be larger as the position of the center of gravity of said radiator is separated farther from the central line of the vehicle body in the widthwise direction thereof.

7. The apparatus according to claim 3, wherein
   two motorized fans are mounted on said radiator at positions offset to two sides from the central line of said radiator along the widthwise direction of the vehicle body, and a position of a center of gravity of said radiator as a whole including said two motorized fans is set at a position offset in the one direction from the central line of the vehicle body in the widthwise direction thereof.

8. The apparatus according to claim 7, wherein
   of said mount members located on the two side positions, in the widthwise direction of the vehicle body, of the lower end of said radiator, a spring constant of the mount member offset in the one direction is set to be smaller than a spring constant of the other mount member.

9. The apparatus according to claim 8, wherein a difference between the spring constants of said mount members located on the two side positions, in the widthwise direction of the vehicle body, of the lower end of said radiator is set to be larger as the position of the center of gravity of said radiator is separated farther from the central line of the vehicle body in the widthwise direction thereof.

10. The apparatus according to claim 1, wherein the spring constants of said mount members are set to have different values between a case wherein said radiator is mounted in a vehicle comprising a manual transmission, and a case wherein said radiator is mounted in a vehicle comprising an automatic transmission.

11. The apparatus according to claim 10, wherein a spring constant value of the mount member nearer the position of the center of gravity of said radiator, which value is set when said radiator is mounted in the vehicle comprising the manual transmission, is set to be smaller than the spring constant which is set when said radiator is mounted in the vehicle comprising the automatic transmission.

12. The apparatus according to claim 10, wherein a spring constant value of the mount member farther from the position of the center of gravity of said radiator, which value is set when said radiator is mounted in the vehicle comprising the manual transmission, is set to be smaller than the spring constant which is set when said radiator is mounted in the vehicle comprising the automatic transmission.

13. The apparatus according to claim 1 wherein the spring constant of one mount member in one of the two side positions is about twice that of the mount member in the other side position.

14. The apparatus according to claim 1 wherein the spring constant of one mount member in one of the two side positions is in the range of about 6 to 9 kg/mm, and the spring constant of the mount member in the other side position is in the range of about 14 to 16 kg/mm.

15. The apparatus according to claim 1 wherein the spring constant in one mount member in one of the two side positions is at least ten percent different than the spring constant in the mount member in the other side position.

16. A dampening system for a vehicle body comprising:

a vehicle body including a radiator support, the vehicle body being susceptible to torsional and flexural vibrational movements in response to input received from a vibration source;

a radiator assembly including a lower end; and a pair of mount members positioned on said radiator support for supporting said radiator assembly, said pair of mount members engaging said radiator assembly at side positions on the lower end of said radiator assembly, the pair of mount members having significantly different spring constants from each other chosen so that the separate resonance frequency pitching and bouncing movements of said radiator assembly substantially coincide with the separate peak frequencies of torsional and flexural vibrational movements of the vehicle body, respectively, the mount member having the smaller spring constant being positioned nearer the center of gravity of said radiator than the other mount member, whereby the pitching and bouncing movements of said radiator assembly dampens the separate torsional and flexural vibrational movements of the vehicle body, respectively.

17. In a radiator support apparatus for a vehicle having an engine that generates vibrations and a vehicle body that undergoes separate torsional and flexural vibrations in response to the engine generated vibrations, said apparatus being adapted for mounting and supporting a lower end of a radiator on the vehicle body via mount members formed of elastic members at two side positions of said lower end of said radiator in a widthwise direction of vehicle body so as to cause a supported radiator to serve as a dynamic damper at a front end portion of the vehicle in a low-engine speed state, the vehicle defining a longitudinal direction and the supported radiator extending in a lateral direction generally transverse to the longitudinal direction, the improvement in which said mount members located on the two side positions have significantly different spring constants so that the resonance frequencies of pitching and bouncing movements of said radiator support apparatus substantially coincide with peak frequencies of the torsional and flexural vibrations of the vehicle body, respectively, the mount member having the smaller constant being positioned nearer the center of gravity of said radiator than the other mount member, whereby the pitching and bouncing movements of said radiator support apparatus dampens the torsional and flexural vibrations of the vehicle body, respectively.

* * * * *

UNITED STATES PATENT AND TRADEMARK OFFICE
CERTIFICATE OF CORRECTION

PATENT NO.  : 5,287,940
DATED       : February 22, 1994
INVENTOR(S) : Soichiro Ogawa et al.

It is certified that error appears in the above-indentified patent and that said Letters Patent is hereby corrected as shown below:

Column 3, line 54, "sides. The" should be --sides, the--.
Column 7, line 1, after "fan" insert --9 is--.
Column 7, line 68, "or a" should be --on a--.
Column 10, line 32, after "direction of" insert --the--.

Signed and Sealed this

Eighteenth Day of October, 1994

Attest:

BRUCE LEHMAN

Attesting Officer        Commissioner of Patents and Trademarks